US012447744B2

(12) United States Patent
Shin et al.

(10) Patent No.: US 12,447,744 B2
(45) Date of Patent: Oct. 21, 2025

(54) INKJET APPARATUS FOR DISPLAY PANEL MANUFACTURING AND SUBSTRATE PROCESSING FACILITY

(71) Applicant: SEMES CO., LTD., Chungcheongnam-do (KR)

(72) Inventors: Cheol Yong Shin, Chungcheongnam-do (KR); Jae Youl Kim, Chungcheongnam-do (KR); In Ho Kim, Chungcheongnam-do (KR); Jin Woo Jang, Chungcheongnam-do (KR)

(73) Assignee: SEMES CO., LTD., Chungcheongnam-do (KR)

( * ) Notice: Subject to any disclaimer, the term of this patent is extended or adjusted under 35 U.S.C. 154(b) by 138 days.

(21) Appl. No.: 18/144,170

(22) Filed: May 6, 2023

(65) Prior Publication Data

US 2024/0001672 A1 Jan. 4, 2024

(30) Foreign Application Priority Data

Jul. 1, 2022 (KR) ........................ 10-2022-0081118

(51) Int. Cl.
*B41J 2/14* (2006.01)

(52) U.S. Cl.
CPC ....... *B41J 2/14314* (2013.01); *B41J 2/14201* (2013.01); *B41J 2002/14491* (2013.01)

(58) Field of Classification Search
CPC ................ B41J 2/14314; B41J 2/14201; B41J 2/14016; B41J 2002/14491; B41J 2002/012; B41J 2/06; B41J 2/085; B41J 2/175; B41J 2/1433; B41J 2/162; B41J 2/04581; H10K 71/135
See application file for complete search history.

(56) References Cited

U.S. PATENT DOCUMENTS 4,333,086 A * 6/1982 Ebi ............................ B41J 2/06 347/55
4,620,198 A * 10/1986 Behun .................... B41J 2/2103 347/85
5,975,683 A 11/1999 Smith et al.
(Continued)

FOREIGN PATENT DOCUMENTS

JP 8-332724 12/1996
JP 2000-168092 A 6/2000
(Continued)

OTHER PUBLICATIONS

Office action from the corresponding Korean Patent Application No. 10-2022-0081118 dated Mar. 22, 2024 with English translation from Global Dossier.
(Continued)

*Primary Examiner* — Kristal Feggins
(74) *Attorney, Agent, or Firm* — WOMBLE BOND DICKINSON (US) LLP

(57) ABSTRACT

An inkjet apparatus for display manufacturing includes a nozzle unit having a discharge port for discharging ink to a substrate, a charging unit disposed on a side of the nozzle unit and charging the ink, and an accelerating electrode disposed on an opposite side of the nozzle unit with the substrate interposed therebetween, and accelerating the ink towards the substrate by electrical attraction.

18 Claims, 8 Drawing Sheets

(56) References Cited

U.S. PATENT DOCUMENTS

| | | | |
|---|---|---|---|
| 2006/0071978 A1 | 4/2006 | Steiner et al. | |
| 2006/0092239 A1 | 5/2006 | Sung et al. | |
| 2006/0209129 A1 | 9/2006 | Onozawa | |
| 2014/0225965 A1 | 8/2014 | Heuft | |

FOREIGN PATENT DOCUMENTS

| | | |
|---|---|---|
| JP | 2003-53977 | 2/2003 |
| JP | 2006-256261 | 9/2006 |
| KR | 10-0580654 | 5/2006 |
| KR | 10-1616654 | 4/2016 |
| KR | 10-2021-0063535 | 6/2021 |

OTHER PUBLICATIONS

Office Action dated Nov. 29, 2024 for Korean Patent Application No. 10-2022-0081118 and its English translation from Global Dossier.

* cited by examiner

INKJET APPARATUS FOR DISPLAY PANEL MANUFACTURING AND SUBSTRATE PROCESSING FACILITY

CROSS-REFERENCE TO RELATED APPLICATION(S)

This application claims benefit of priority to Korean Patent Application No. 10-2022-0081118 filed on Jul. 1, 2022 in the Korean Intellectual Property Office, the disclosure of which is incorporated herein by reference in its entirety.

BACKGROUND

1. Field

The present disclosure relates to an inkjet apparatus for display panel manufacturing, for discharging ink onto a substrate, and a substrate processing facility.

2. Description of Related Art

In general, an inkjet apparatus is a device that prints an image of a predetermined color on the surface of a printing object by ejecting minute droplets of ink to a required location on a printing object such as paper or fabric. To manufacture a display device, inkjet equipment is widely used to discharge droplets, such as when forming an alignment film, applying UV ink, or applying a color filter on a substrate.

To avoid quality defects in displays and to increase resolution, in the process of manufacturing the substrate constituting the display, it is necessary for the ink to be ejected from the inkjet apparatus and to reach a correct position on the board.

SUMMARY

An aspect of the present disclosure is to provide an inkjet apparatus for display panel manufacturing allowing ejected ink to reach an accurate position on a substrate, and a substrate processing facility.

According to an aspect of the present disclosure, an inkjet apparatus for display manufacturing includes a nozzle unit having a discharge port for discharging ink to a substrate; a charging unit disposed on a side of the nozzle unit and charging the ink; and an accelerating electrode disposed on an opposite side of the nozzle unit with the substrate interposed therebetween, and accelerating the ink towards the substrate by electrical attraction.

The charging unit may include a charging body in contact with the discharge port and grounded; and a charging electrode spaced apart from the charging body and connected to a voltage source. The charging body may be charged with an opposite polarity of the charging electrode by the charging electrode.

The accelerating electrode may be connected to a voltage source and may have the same polarity as a polarity of the charging electrode. As an example, when the charging electrode and the accelerating electrode are positively charged by the voltage source, the charging body may be negatively charged, and the ink in contact with the charging body may be negatively charged. As another example, when the charging electrode and the accelerating electrode are negatively charged by the voltage source, the charging body may be positively charged, and the ink in contact with the charging body may be positively charged.

A voltage supplied to the charging electrode may be lower than a voltage supplied to the accelerating electrode.

The charging body may be provided with a vertical hole formed to vertically communicate with the discharge port. The vertical hole may have a diameter less than a diameter of the discharge port.

The nozzle unit may be provided in plurality, and the charge body may be formed of a plate shape in which a plurality of the vertical holes are formed. The accelerating electrode may have a plate shape corresponding to a size of the substrate.

The nozzle unit may be provided with a piezoelectric element installed to eject the ink in a piezoelectric manner. As another example, the nozzle unit may be provided with a heating element installed to discharge the ink in a thermal transfer method.

According to an aspect of the present disclosure, an inkjet apparatus for display manufacturing includes an inkjet head body including an ink chamber accommodating ink and an ink flow path connected to the ink chamber; a nozzle unit disposed in the inkjet head body, and having a discharge port connected to the ink chamber and discharging the ink to a substrate; a charging unit disposed on a side of the nozzle unit and charging the ink; and an accelerating electrode disposed on an opposite side of the nozzle unit with the substrate interposed therebetween, and accelerating the ink towards the substrate by means of electrical attraction. The charging unit includes a charging body installed adjacent to the discharge port and grounded; and a charging electrode spaced apart from the charging body and connected to a voltage source. The charging body is charged with a polarity opposite to a polarity of the charging electrode by the charging electrode.

According to an aspect of the present disclosure, a substrate processing facility includes the inkjet apparatus for display manufacturing described above; an ink reservoir in which ink is stored; an inkjet head body connected to the ink reservoir by an ink supply pipe, having an ink chamber accommodating the ink and an ink flow path connected to the ink chamber, and provided with a nozzle unit of the inkjet apparatus for display manufacturing; a head moving device moving the inkjet head body; and a substrate moving device moving the substrate.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
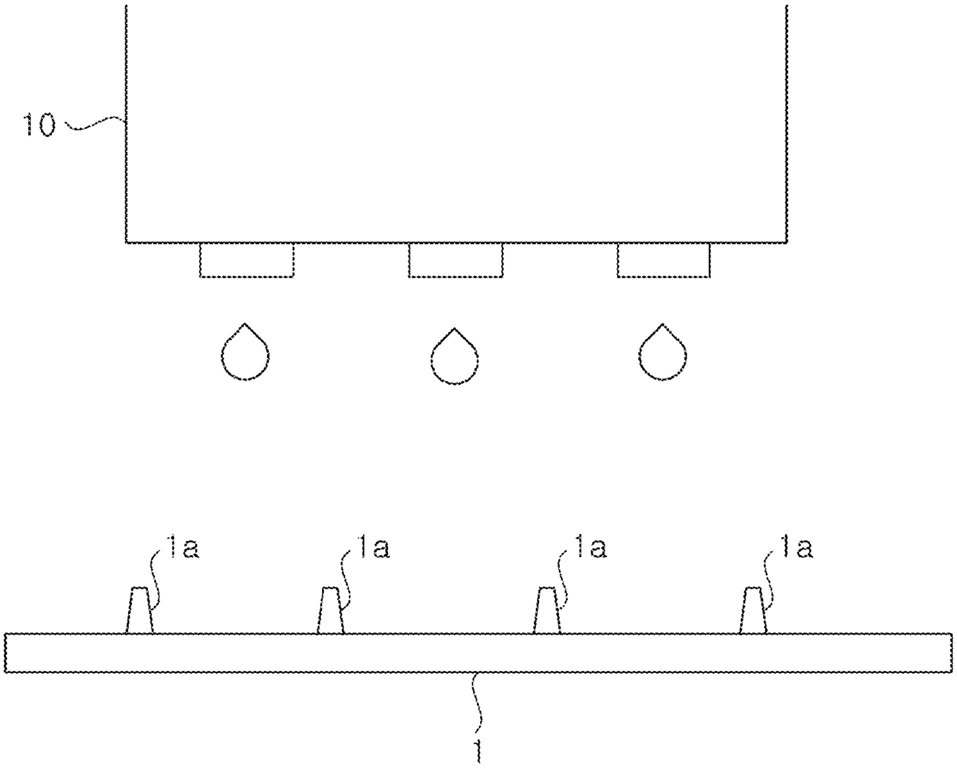
FIG. 1 is a view illustrating that an inkjet apparatus for display manufacturing according to the related art ejects ink onto a substrate.

Hereinafter, embodiments will be described in detail so that those skilled in the art may easily practice the present disclosure with reference to the accompanying drawings. However, in describing a preferred embodiment in detail, if it is determined that a detailed description of a related known function or configuration may unnecessarily obscure the gist of the present disclosure, the detailed description will be omitted. In addition, the same reference numerals are used throughout the drawings for parts having similar functions and actions. In addition, in the present specification, terms such as 'on', 'upper portion', 'upper surface', 'below', 'lower portion', 'lower surface', 'side' and the like are based on the drawings, and may be changed depending on the direction in which components are actually disposed.

In addition, throughout the specification, when a part is said to be 'connected' to another part, it is not only 'directly connected', but also 'indirectly connected' with other components therebetween. Further, 'including' a certain component means that other components may be further included, rather than excluding other components unless otherwise stated.

FIG. 1 is a view illustrating that an inkjet apparatus for display manufacturing according to the related art ejects ink to a substrate.

Referring to FIG. 1, as a substrate 1, various substrates may be used to manufacture an organic EL display device, or a transparent substrate for manufacturing a liquid crystal display device or the like. For example, a substrate of glass, polyethylene naphthalate (PEN), polyethlene terephthalate (PET), polyether sulfone (PES), polyimide (PI) or the like may be used. A liquid chemical (ink) is ejected onto the substrate 1 in a preset shape by an inkjet apparatus 10. For example, pixel barriers 1*a* constituting the pixel are formed on the substrate 1, and respective color ink of Red, Green and Blue (RGB), which is the three primary colors of an image, is ejected to the space formed by the pixel barriers 1*a*.

It may be ideal for an inkjet apparatus in a substrate processing facility to allow ejected ink to reach the substrate vertically. However, in reality, the ejected ink is not guided exactly perpendicular to the substrate. When printing a substrate by an inkjet apparatus, an error in the point of impact occurs due to the transfer of the substrate, and ink may be bent from a vertical trajectory due to various environmental factors such as temperature change or air flow between a nozzle unit of an inkjet apparatus and a substrate. As an example, to increase the resolution, it is good that the size of the ink droplet ejected from the inkjet apparatus is small, but when the ink droplets are minute, the ink droplets reach the substrate while being further bent in a vertical trajectory by the viscous resistance of air. As such, ink droplets bent in a vertical trajectory reach an unspecified position on the substrate (impact point error), thereby adversely affecting the image quality after printing.

To avoid the above-mentioned defects in image quality, in the present disclosure, ink may be guided to a set position on a substrate, for example, an accurate position during ejection. In detail, according to an embodiment of the present disclosure, as the acceleration of the ink that is ejected and moves increases, thereby significantly preventing the ink from bending from the vertical trajectory, and therefore, the resolution of a display including a substrate may be improved.

The substrate processing facility according to an embodiment of the present disclosure includes an inkjet apparatus 1000 illustrated in FIGS. 2 to 5, and although not illustrated in the drawings, includes an ink reservoir, a head moving device, and a substrate moving device.

The ink reservoir has a storage space in which ink is stored. This ink reservoir is connected to the inkjet head body of the inkjet apparatus by the ink supply pipe.

Also, the head moving device is configured to move the inkjet head body. The head moving device is not limited by the present disclosure, and any moving device of the related art that is connected to the inkjet head body to move the inkjet head body may be used, of course.

The substrate moving device is configured to move the substrate. The substrate moving device moves while supporting both edges of the substrate, to move the substrate from the lower side of the inkjet apparatus, and alternatively, the rollers such as table rollers may axially rotate to move the substrate. Such a substrate moving device is not limited by the present disclosure, and any moving device of the related art that moves a substrate in a state in which the upper surface of the substrate on which ink is printed is not covered may be utilized.

Figure 2:
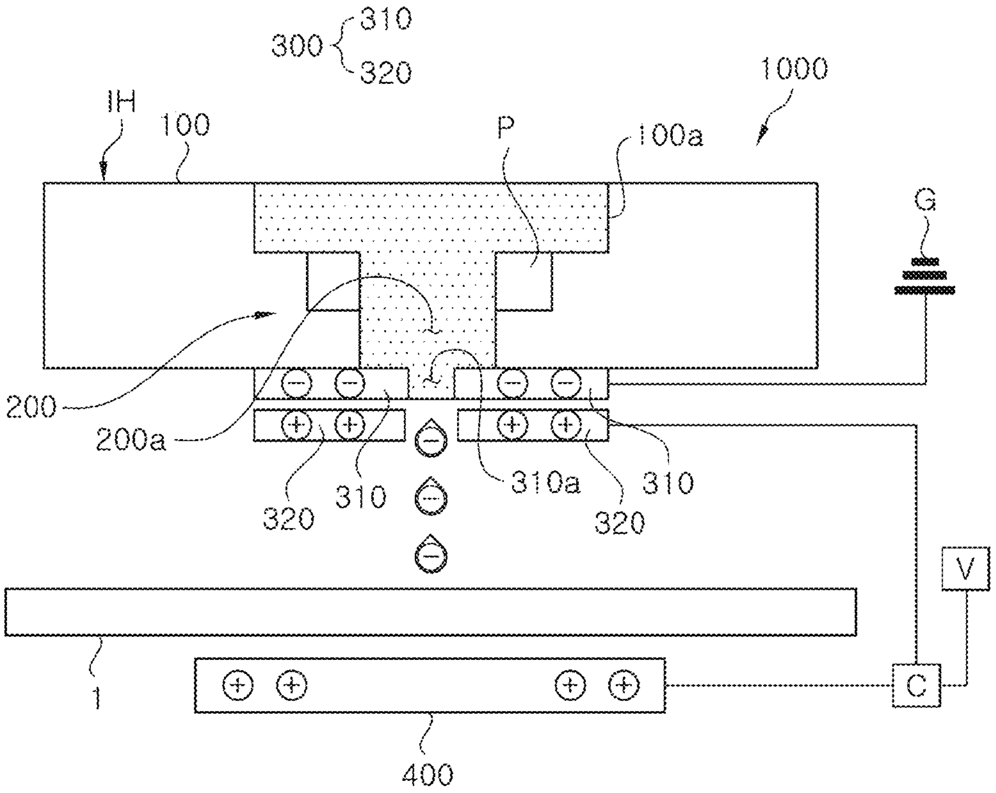
FIGS. 2 and 3 are diagrams illustrating an inkjet apparatus for display manufacturing according to a first embodiment.
Figure 3:
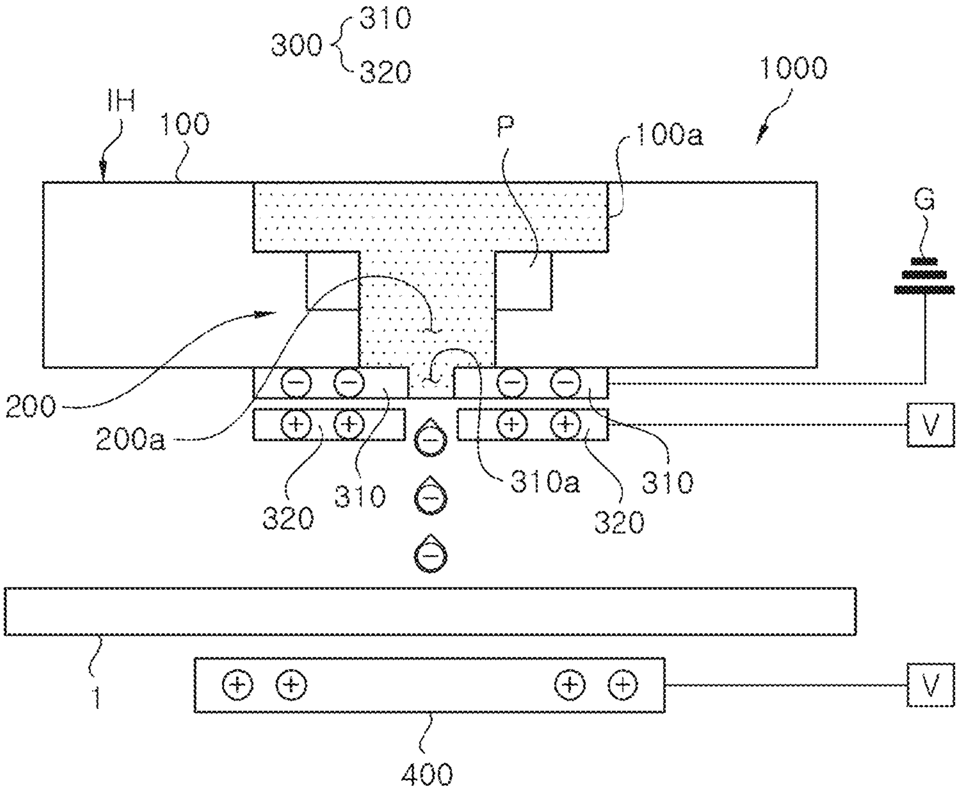

FIGS. 2 and 3 are diagrams illustrating an inkjet apparatus for display manufacturing according to a first embodiment.

Referring to the drawings, an inkjet apparatus 1000 for display manufacturing according to an embodiment of the present disclosure includes an inkjet head IH comprised of an inkjet head body 100 and a nozzle unit 200, a charging unit 300, and an accelerating electrode 400.

The inkjet head body 100 is connected to an ink reservoir by an ink supply pipe. The inkjet head body 100 is provided with an ink chamber 100*a* and an ink flow path (not illustrated). Ink is accommodated in the ink chamber 100*a*, and the ink flow path is connected to the ink chamber 100*a*. The inkjet head body 100 is a member that determines the external appearance of the inkjet apparatus 1000, and a detailed shape and structure thereof are not limited by the present disclosure, of course.

The nozzle unit 200 is formed on the inkjet head body 100. The nozzle unit 200 has a discharge port 200*a* connected to the ink chamber 100*a* and discharging ink to a substrate 1. The discharge port 200*a* of the nozzle unit 200 communicates with the ink chamber 100*a*, and thus, the ink stored in the ink chamber 100*a* may be discharged through the discharge port 200*a* of the nozzle unit 200. The discharge port 200*a* of the nozzle unit 200 has a relatively smaller diameter than the ink chamber 100*a*, and when the ink accommodated in the ink chamber 100*a* is discharged through the discharge port 200*a* of the nozzle unit 200, the ink may be discharged at a high speed. As a detailed example, a piezoelectric element P may be installed in the nozzle unit 200 to discharge ink in a piezoelectric manner. The discharge of ink by a piezoelectric ejection method is a method of ejecting ink droplets using the piezoelectric element (P) of which the shape is deformed when a voltage is applied. When a current in the form of a pulse flows through the piezoelectric element P, the shape of the piezoelectric element P changes. The piezoelectric element P of which the shape is changed as described above applies pressure to the ink by changing the internal volume of the nozzle unit 200. As a result, the ink in the nozzle unit 200 is ejected out through the nozzle unit 200 in the form of droplets. For example, in the piezoelectric method, the piezoelectric element P serves as an actuator that generates a driving force for ink ejection.

The charging unit 300 is disposed on the side of the nozzle unit 200 to charge the ink. The charging unit 300 includes a charging body 310 and a charging electrode 320. The charging body 310 is disposed to be in contact with the discharge port 200*a* and is grounded. For example, the charging body 310 is connected to the ground (G). At this time, the ground (G) serves to supply electric charges to the charging body 310 and to significantly reduce the effect of charging on other parts of the inkjet head (IH). The charging electrode 320 is spaced apart from the charging body 310 and is connected to the voltage source (V). The charging body 310 is charged with the opposite polarity of the charging electrode 320 by the charging electrode 320. In detail, the charging electrode 320 is supplied with a voltage from the voltage source (V), to be charged, and has one polarity, and accordingly, the charging body 310 is charged with the opposite polarity by the charge of the charging electrode 320. At this time, the charging body 310 is charged with the opposite polarity of the charging electrode 320 by receiving charge through the ground (G). The charging body 310 charged in this manner charges the ink in contact with the discharge port 200*a*.

The accelerating electrode 400 is disposed on the opposite side of the nozzle unit 200 with the substrate 1 interposed therebetween. At this time, the accelerating electrode 400 is connected to the voltage source V, and has the same polarity as the charging electrode 320. For example, the accelerating electrode 400 receives a voltage from the voltage source V and is charged with electric charge to form an electrode, which has the same polarity as the charging electrode 320. The accelerating electrode 400 attracts the ink having the opposite polarity by electric attraction, thereby accelerating the ink toward the substrate 1 when the ink is ejected toward the substrate 1.

As an example, when the charging electrode 320 and the accelerating electrode 400 are positively charged by the voltage source V, the charging body 310 is negatively charged, and ink in contact with the charging body 310 is negatively charged. When the negatively charged ink is ejected toward the substrate 1, the ink is electrically attracted by the positively charged accelerating electrode 400 and is accelerated towards the substrate 1.

Alternatively, as another example, when the charging electrode 320 and the accelerating electrode 400 are negatively charged by the voltage source V, the charging body 310 is positively charged, and ink in contact with the charge body 310 is charged with positive charge. When the ink charged with positive charge is discharged toward the substrate 1, the ink is electrically attracted by the accelerating electrode 400 having a negative electrode and accelerated towards the substrate 1.

In more detail, the voltage supplied to the charging electrode 320 may be lower than the voltage supplied to the accelerating electrode 400. The charging electrode 320 serves to charge the charging body 310 and ultimately to charge the ink. In contrast, the accelerating electrode 400 serves to electrically attract the ink toward the substrate 1. Therefore, when the voltage supplied to the accelerating electrode 400 is greater than the voltage supplied to the charging electrode 320, the ink is attracted more strongly than the ink being attracted toward the charging electrode 320, thereby increasing the acceleration of the ink. For example, by the electric attraction of the accelerating electrode 400, which is relatively greater than the charging electrode 320, in addition to the basic force due to the ejection force of ink from the nozzle unit 200 and gravity; the acceleration force of the ink toward the accelerating electrode 400 may be increased. At this time, as an example, as illustrated in FIG. 2, the charging electrode 320 and the accelerating electrode 400 may be connected to one voltage source V, and a controller (C) may be installed at a branched portion of the connection line to control the application of separate voltages to the charging electrode 320 and the accelerating electrode 400, respectively. Also, as another example, as illustrated in FIG. 3, the charging electrode 320 and the accelerating electrode 400 may be connected to different voltage sources V.

On the other hand, the charging body 310 may have a vertical hole 310*a* vertically communicating with the discharge port 200*a* of the nozzle unit 200. The vertical hole 310*a* may have a diameter less than a diameter of the discharge port 200*a*. Accordingly, before the ink is discharged through the discharge port 200*a* of the nozzle unit 200, the ink may come into contact with the upper surface of the charging body 310. Since the contact surface of the ink with the charging body 310 is increased, the ink may be smoothly charged and receive a lot of charge from the charging body 310. As a result, the electric attraction on the accelerating electrode 400 is further increased, and thus, the acceleration force of the ink on the substrate 1 may be further increased. For reference, the vertical hole 310*a* may be formed in an appropriate size in consideration of ensuring an appropriate discharge amount of ink for the substrate 1.

Figure 4:
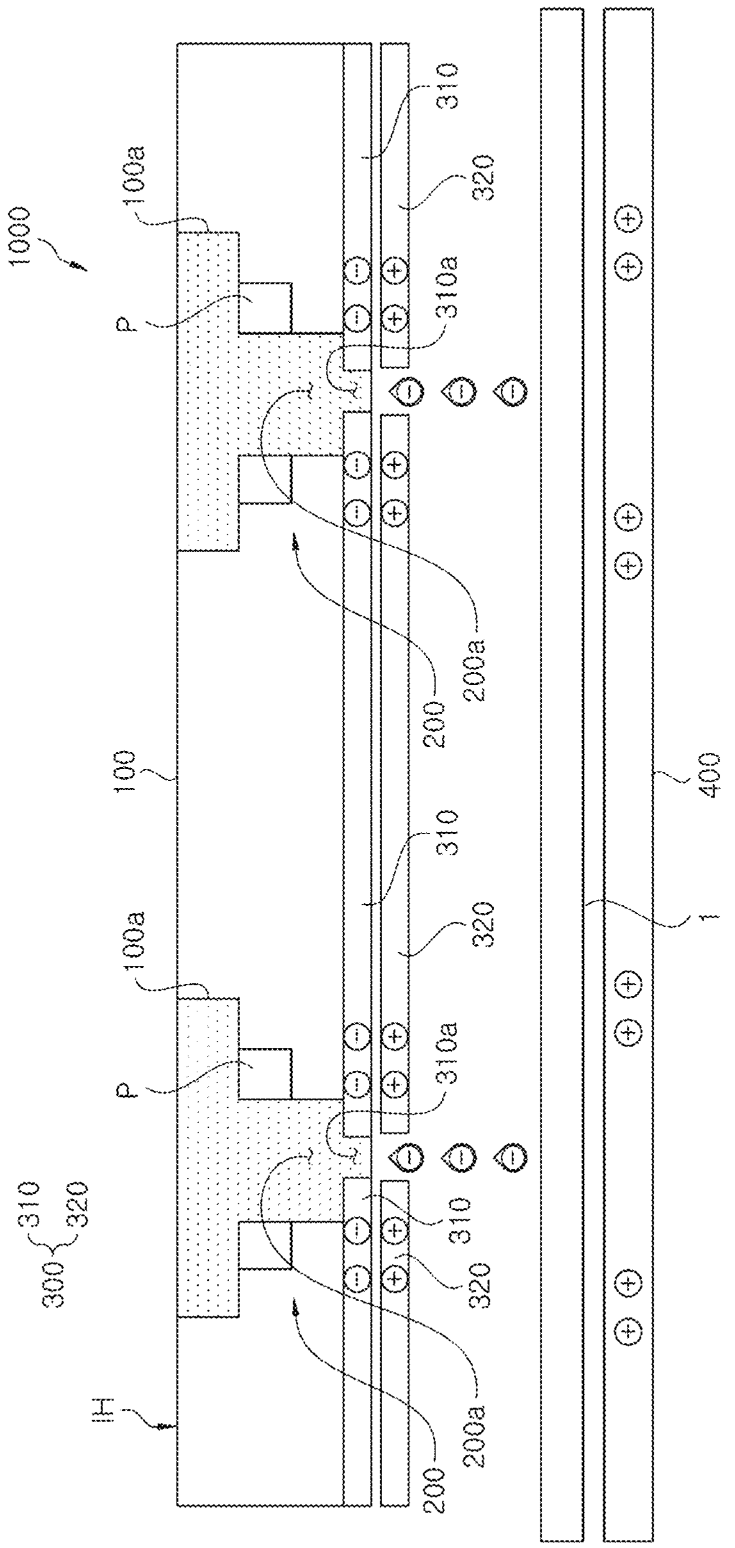
FIG. 4 is a diagram illustrating an inkjet apparatus for display manufacturing according to a second embodiment.

FIG. 4 is a diagram illustrating an inkjet apparatus for display manufacturing according to a second embodiment.

Referring to the drawings, in the present disclosure, a plurality of nozzle units 200 may be formed. In this case, the charging body 310 may be formed in a plate shape in which a plurality of vertical holes 310*a* are formed.

The substrate 1 processed in a substrate processing facility has a large area size of 2 m×2 m as an example. The large-area substrate 1 has a plurality of very small pixel spaces (spaces formed by the pixel barriers 1*a*). To efficiently print a plurality of pixel spaces, a plurality of nozzle units 200 according to an embodiment of the present disclosure may be provided. As an example, the plurality of nozzle units 200 may be formed to correspond to the size of the large-area substrate 1, and as another example, even if the nozzle unit 200 is smaller than the size of the large-area substrate 1, the plurality of nozzle units may be formed to correspond to a predetermined range size of the substrate 1.

The charging body 310 may be formed in a plate shape in which a plurality of vertical holes 310*a* are formed to correspond to the plurality of nozzle units 200. For example, the charging body 310 may have the shape of a plate having a size corresponding to the size of the large-area substrate 1 as an example, and as another example, even if the charging body is smaller than the size of the large-area substrate 1, the charging body may have the shape of a plate of a size corresponding to the size of the substrate 1 within a predetermined range.

Furthermore, the accelerating electrode 400 may be formed in a plate shape corresponding to the size of the substrate 1. The substrate 1 is printed by an inkjet head (IH) in a state of being disposed above the accelerating electrode 400. In the process of printing on the substrate 1 while the inkjet head (IH) is moving, the ink may be smoothly accelerated by the accelerating electrode 400 corresponding to the entire area of the substrate 1.

On the other hand, the functions of the components described above in FIG. 4 are omitted since they are described in the first embodiment of FIGS. 2 and 3 above, and the components of the remaining reference numerals are also described in the first embodiment of FIGS. 2 and 3 above and may thus be omitted. Furthermore, although not illustrated, the voltage source and the ground may have the same arrangement structure and function as in the first embodiment.

Figure 5:
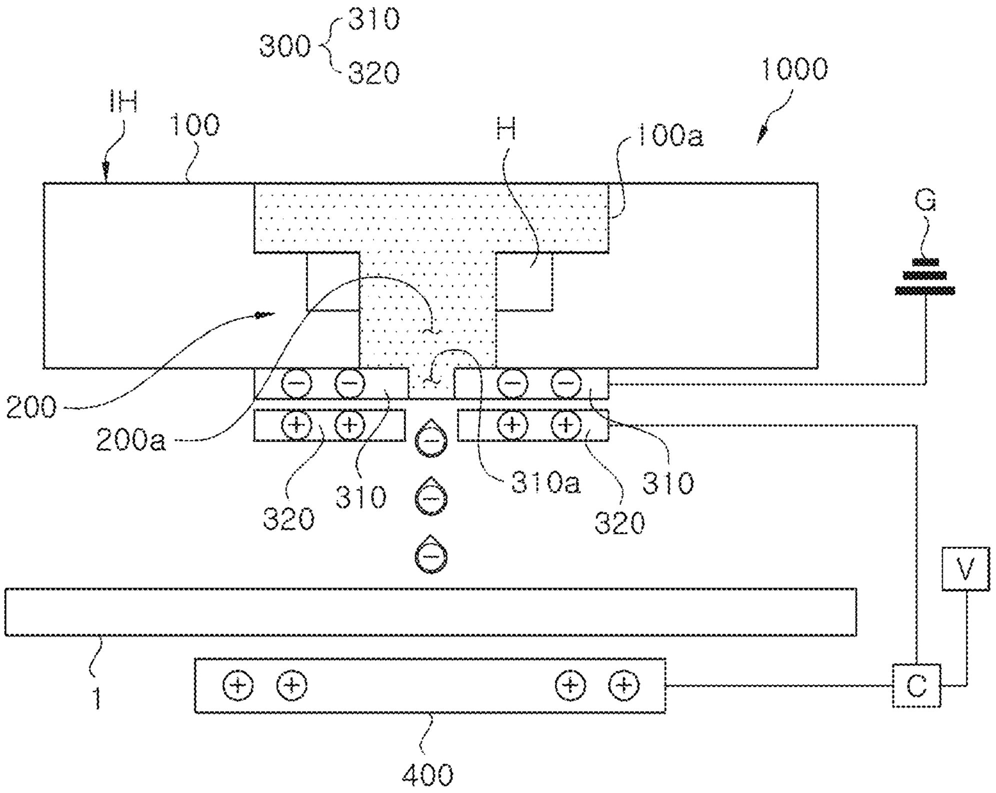
FIG. 5 is a diagram illustrating an inkjet apparatus for display manufacturing according to a third embodiment.

FIG. 5 is a diagram illustrating an inkjet apparatus for display manufacturing according to a third embodiment.

Referring to the drawings, in a nozzle unit 200 of the present disclosure, a heating element H may be installed to discharge ink in a thermal transfer method. When a current in the form of a pulse flows through the heating element (H) formed of a resistance heating element, as heat is generated from the heating element H, adjacent ink is heated within a short time. As such, the heated ink boils to generate bubbles, and the generated bubbles expand to apply pressure to the ink. As a result, the ink in the nozzle unit 200 is ejected out through the nozzle unit 200 in the form of droplets. For example, in the thermal transfer method, the heating element H serves as an actuator that generates a driving force for ink ejection.

On the other hand, the functions of the components described above in FIG. 5 are omitted because they are described in the first embodiment of FIGS. 2 and 3 above. In addition, configurations of the remaining reference numerals are omitted because they are described in the first embodiment of FIGS. 2 and 3 above.

Figure 6:
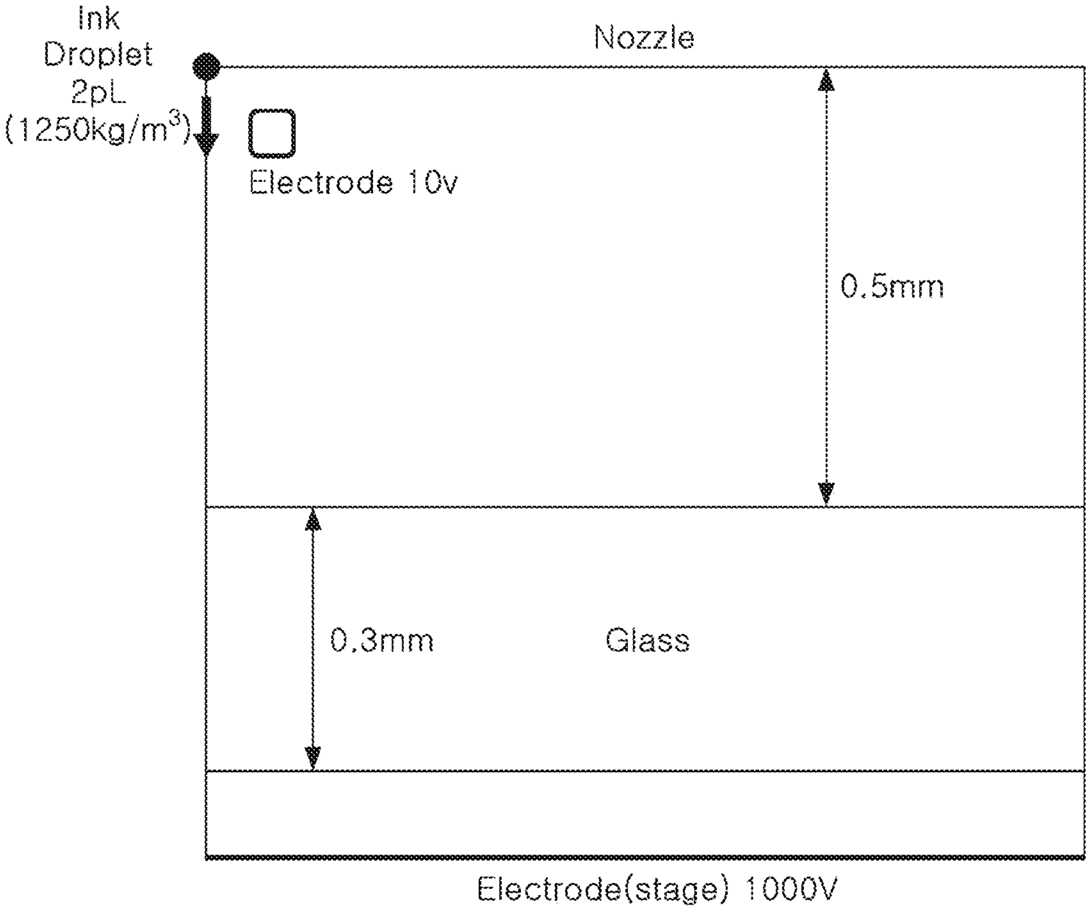
FIG. 6 is a diagram illustrating the distance between a substrate and a nozzle unit and a thickness of the substrate.
Figure 7:
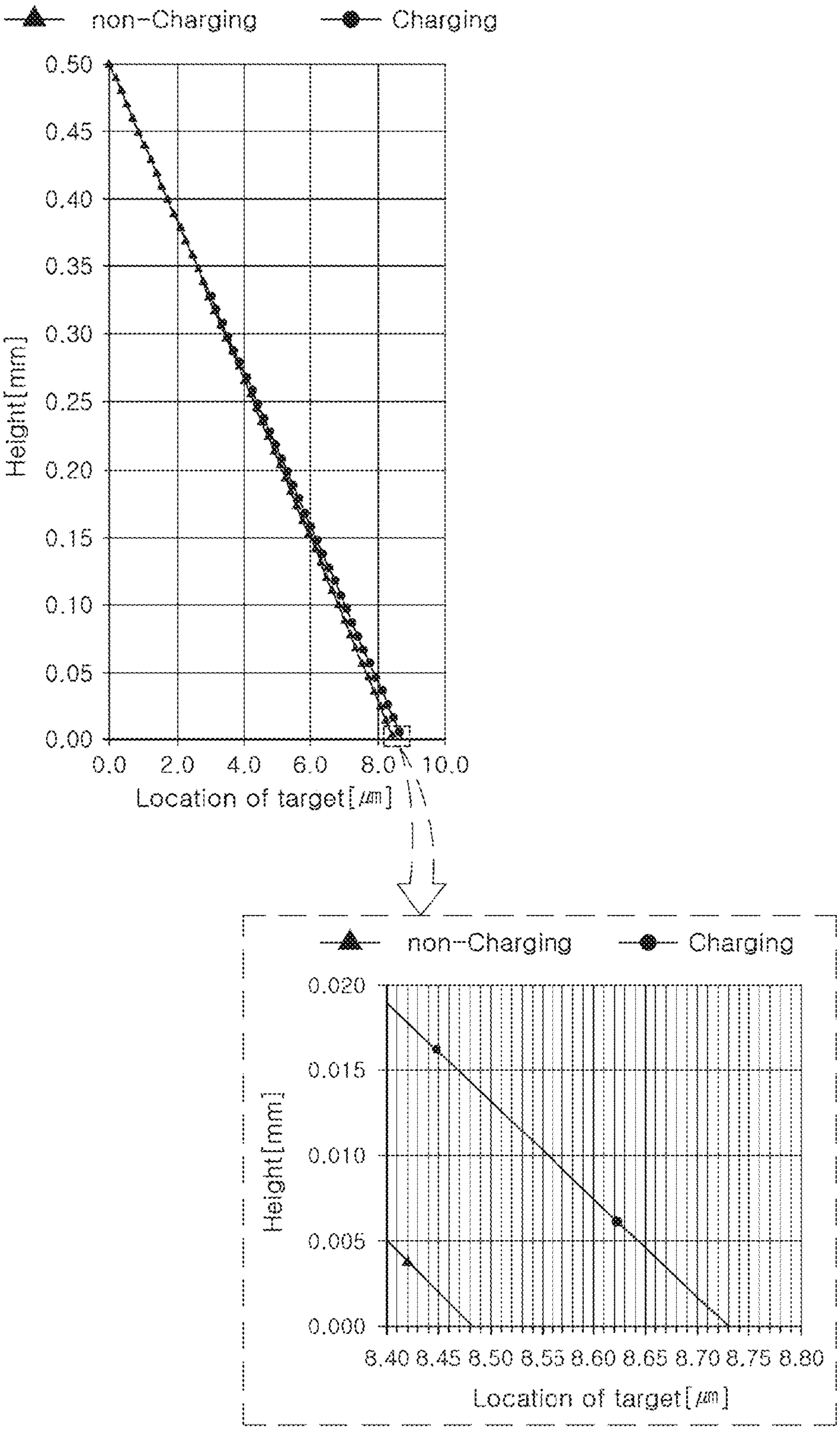
FIG. 7 is a graph illustrating changes in impact points of ink ejected onto a substrate.
Figure 8:
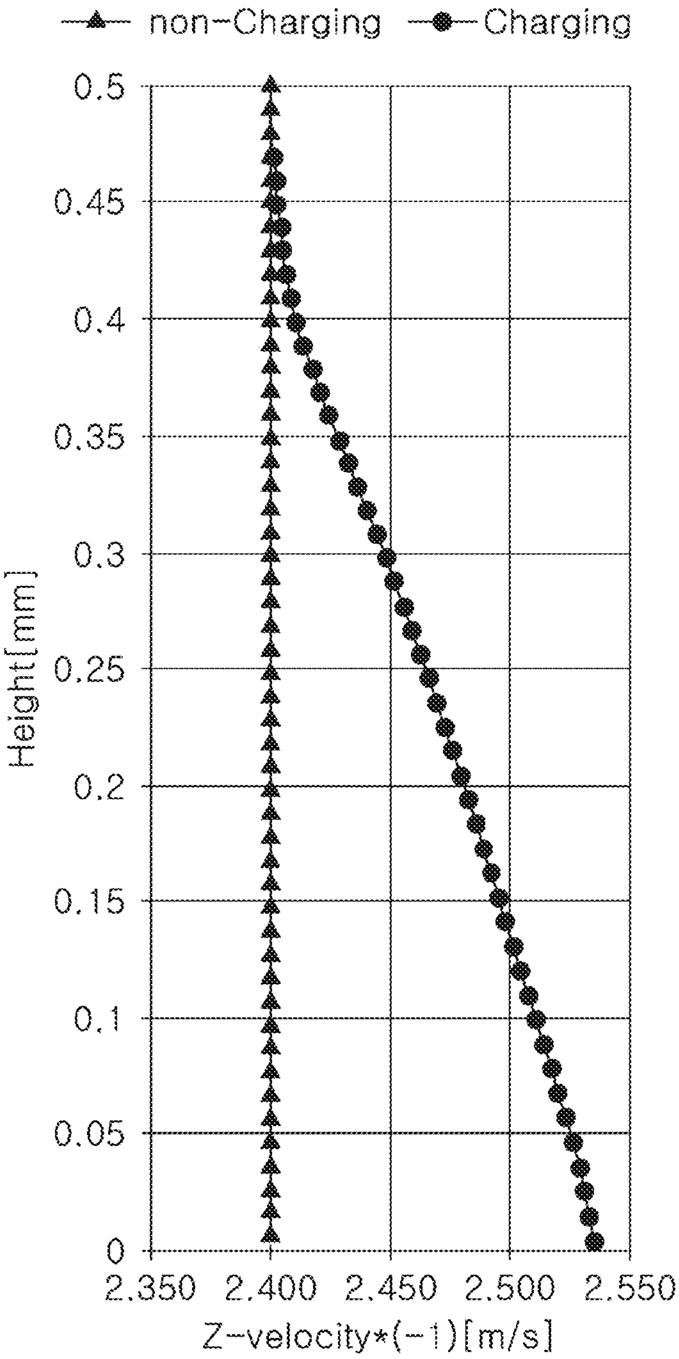
FIG. 8 is a graph illustrating a change in the falling speed of the ink ejected onto a substrate.

FIG. 6 is a view illustrating the distance between the substrate and the nozzle unit and the thickness of the substrate, FIG. 7 is a graph illustrating changes in the impact point of ink ejected onto a substrate, and FIG. 8 is a graph illustrating the change in the drop speed of the ink ejected to the substrate.

Referring to the drawing, as described above, the ink charged by the charging unit 300 is accelerated toward the substrate 1 by electric attraction by the accelerating electrode 400, and deviation from the vertical trajectory moving towards the substrate 1 may be significantly reduced. For example, according to an embodiment of the present disclosure, the effect of correcting the deviation angle error of the ink due to the acceleration of the ink with respect to the substrate 1 side may be obtained. In detail, the falling speed of the ink droplets subjected to the force in the vertical direction is accelerated, and as the time to reach the substrate 1 is relatively shortened, an error in the point of impact due to the transfer of the substrate 1 may be reduced. As an example, if the electric field analysis is performed under the same condition as in FIG. 6, the ink droplet ejection angle correction effect and acceleration effect may be predicted. Referring to FIG. 7, when the ink droplet ejection is in the direction of 1° based on the vertical, in the case of the correction effect by electric field charging, it can be seen that the error of the impact point during non-charging is 8.73 μm and the error of the impact point during charging is 8.48 μm, and therefore, about 0.25 μm was corrected. As for the droplet acceleration effect of ink, referring to FIG. 8, based on the initial speed of ink droplets of 2.4 m/s, there is no change in speed when not charging, and when charging, the speed is 2.535 m/s. Therefore, it can be seen that an increase effect on the speed of about 6% is obtained compared to the initial speed.

As set forth above, according to an embodiment, as the charging unit and the accelerating electrode are configured, the ink may be accelerated towards the substrate when ejecting the ink, thereby reducing the positional error of the point of impact of the ink on the substrate.

While embodiments have been illustrated and described above, it will be apparent to those skilled in the art that modifications and variations could be made without departing from the scope of the present disclosure as defined by the appended claims.

What is claimed is:

1. An inkjet apparatus for display manufacturing, comprising:

a nozzle unit having a discharge port for discharging ink to a substrate;

a charging unit disposed on a side of the nozzle unit and charging the ink; and an accelerating electrode disposed on an opposite side of the nozzle unit with the substrate interposed therebetween, and accelerating the ink towards the substrate by electrical attraction, wherein the charging unit includes a charging body in contact with the discharge port and grounded; and a charging electrode spaced apart from the charging body and connected to a voltage source, and wherein the accelerating electrode is connected to a voltage source and has the same polarity as a polarity of the charging electrode.

2. The inkjet apparatus of claim 1, wherein the charging body is charged with and opposite polarity of the charging electrode by the charging electrode.

3. The inkjet apparatus of claim 2, wherein the charging body is provided with a vertical hole formed to vertically communicate with the discharge port.

4. The inkjet apparatus of claim 3, wherein the vertical hole has a diameter less than a diameter of the discharge port.

5. The inkjet apparatus of claim 4, wherein the nozzle unit is provided in plurality, and the charge body is formed of a plate shape in which a plurality of the vertical holes are formed.

6. The inkjet apparatus of claim 2, wherein the accelerating electrode has a plate shape corresponding to a size of the substrate.

7. The inkjet apparatus of claim 1, wherein when the charging electrode and the accelerating electrode are positively charged by the voltage source, the charging body is negatively charged, and the ink in contact with the charging body is negatively charged, and when the charging electrode and the accelerating electrode are negatively charged by the voltage source, the charging body is positively charged, and the ink in contact with the charging body is positively charged.

8. The inkjet apparatus of claim 1, wherein a voltage supplied to the charging electrode is lower than a voltage supplied to the accelerating electrode.

9. The inkjet apparatus of claim 1, wherein the nozzle unit is provided with a piezoelectric element installed to eject the ink in a piezoelectric manner.

10. The inkjet apparatus of claim 1, wherein the nozzle unit is provided with a heating element installed to discharge the ink in a thermal transfer method.

11. A substrate processing facility comprising:

the inkjet apparatus for display manufacturing according to claim 1;

an ink reservoir in which ink is stored;

an inkjet head body connected to the ink reservoir by an ink supply pipe, having an ink chamber accommodating the ink and an ink flow path connected to the ink chamber, and provided with a nozzle unit of the inkjet apparatus for display manufacturing;

a head moving device moving the inkjet head body; and a substrate moving device moving the substrate.

12. An inkjet apparatus for display manufacturing, comprising:

an inkjet head body including an ink chamber accommodating ink and an ink flow path connected to the ink chamber;

a nozzle unit disposed in the inkjet head body, and having a discharge port connected to the ink chamber and discharging the ink to a substrate;

a charging unit disposed on a side of the nozzle unit and charging the ink; and an accelerating electrode disposed on an opposite side of the nozzle unit with the substrate interposed therebetween, and accelerating the ink towards the substrate by electrical attraction, wherein the charging unit includes;

a charging body installed adjacent to the discharge port and grounded; and a charging electrode spaced apart from the charging body and connected to a voltage source, and the charging body is charged with a polarity opposite to a polarity of the charging electrode by the charging electrode, and wherein the accelerating electrode is connected to a voltage source and has the same polarity as the charging electrode.

13. The inkjet apparatus of claim 12, wherein when the charging electrode and the accelerating electrode are positively charged by the voltage source, the charging body is negatively charged, and the ink in contact with the charging body is negatively charged, and when the charging electrode and the accelerating electrode are negatively charged by the voltage source, the charging body is positively charged, and the ink in contact with the charging body is positively charged.

14. The inkjet apparatus of claim 12, wherein a voltage supplied to the charging electrode is lower than a voltage supplied to the accelerating electrode.

15. The inkjet apparatus of claim 12, wherein the charging body is provided with a vertical hole vertically communicating with the discharge port, wherein the vertical hole has a diameter less than a diameter of the discharge port.

16. The inkjet apparatus of claim 12, wherein a plurality of nozzle units are provided to correspond to a size of the substrate, and the charging body has a plate shape in which a vertical hole vertically communicating with the discharge port is formed and a plurality of vertical holes are formed to correspond to a plurality of discharge ports formed in the plurality of nozzle units.

17. The inkjet apparatus of claim 12, wherein the accelerating electrode has a plate shape corresponding to a size of the substrate.

18. The inkjet apparatus of claim 12, wherein the nozzle unit is provided with a piezoelectric element installed to eject ink in a piezoelectric manner.

* * * * *